United States Patent
Zhou et al.

(10) Patent No.: US 12,484,621 B2
(45) Date of Patent: Dec. 2, 2025

(54) ELECTRONIC BAKING CIGARETTE DEVICE AND HEATING APPARATUS THEREOF

(71) Applicant: SHENZHEN SMOORE TECHNOLOGY LIMITED, Guangdong (CN)

(72) Inventors: Hongming Zhou, Shenzhen (CN); Xingfu Zhang, Shenzhen (CN); Zhenqian Cheng, Shenzhen (CN); Junjie Xiao, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 716 days.

(21) Appl. No.: 17/691,469

(22) Filed: Mar. 10, 2022

(65) Prior Publication Data
US 2022/0192267 A1     Jun. 23, 2022

Related U.S. Application Data

(63) Continuation of application No. PCT/CN2020/109895, filed on Aug. 18, 2020.

(30) Foreign Application Priority Data

Sep. 12, 2019    (CN) .......................... 201910867477.2

(51) Int. Cl.
*A24F 40/46*        (2020.01)
*A24F 40/20*        (2020.01)
(Continued)

(52) U.S. Cl.
CPC .............. *A24F 40/46* (2020.01); *A24F 40/20* (2020.01); *H05B 3/06* (2013.01); *H05B 3/16* (2013.01); *H05B 2203/013* (2013.01)

(58) Field of Classification Search
CPC .......... A24F 40/46; A24F 40/20; H05B 3/06; H05B 1/16; H05B 2203/013
See application file for complete search history.

(56) References Cited

U.S. PATENT DOCUMENTS

2015/0027471 A1* 1/2015 Feldman .................. H05B 3/06
                                                              392/395
2018/0064170 A1  3/2018 Peuchert et al.

FOREIGN PATENT DOCUMENTS

CN        108495386 A  *  9/2018
CN        108634370 A     10/2018
(Continued)

OTHER PUBLICATIONS

English machine translation of CN 108495386 to Liu; Sep. 4, 2018; H05B3/16; 20 pages. (Year: 2018).*

(Continued)

*Primary Examiner* — Linda L Gray
(74) *Attorney, Agent, or Firm* — Leydig, Voit & Mayer, Ltd.

(57) ABSTRACT

A heating apparatus for an electronic baking cigarette device includes a substrate and a heating element on the substrate. The substrate includes a root portion configured for fixing and an end portion for inserting a cigarette. The substrate includes a first region close to the root portion and a second region close to the end portion, the first region has a first thermal conductivity, the second region has a second thermal conductivity, and the first thermal conductivity is less than the second thermal conductivity. The heating element is located in the first region. The substrate adopts a gradient thermal conductivity layout, so that the heating apparatus can have advantages such as a higher energy utilization rate, a better temperature field, a large amount of vapor during vaping, and a better vaping taste.

19 Claims, 6 Drawing Sheets

(51) Int. Cl.
H05B 3/06 (2006.01)
H05B 3/16 (2006.01)

(56) References Cited

FOREIGN PATENT DOCUMENTS

| | | |
|---|---|---|
| CN | 108851249 A | 11/2018 |
| CN | 208242858 U | 12/2018 |
| CN | 208259013 U | 12/2018 |
| CN | 109123804 A | 1/2019 |
| CN | 110200331 A | 9/2019 |
| CN | 110652042 A | 1/2020 |
| EP | 2921065 A1 | 9/2015 |
| WO | 2018220558 A1 | 12/2018 |

OTHER PUBLICATIONS

European Patent Office, Communication and Supplementary Search Report in European Patent Application No. 20863659.7 (Oct. 4, 2022).
Chinese Patent Office, First Office Action in Chinese Patent Application No. 201910983786.6 (Sep. 14, 2021).
Chinese Patent Office, Second Office Action in Chinese Patent Application No. 201910983786.6 (Jan. 26, 2022).
Patent Cooperation Treaty, International Search Report, International Application No. PCT/CN2020/109895 (Nov. 11, 2020).
Patent Cooperation Treaty, Written Opinion of the International Searching Authority, International Application No. PCT/CN2020/109895 (Nov. 11, 2020).
Chinese Patent Office, Rejection Decision in Chinese Patent Application No. 201910983786.6 (Jul. 13, 2022).

* cited by examiner

ELECTRONIC BAKING CIGARETTE DEVICE AND HEATING APPARATUS THEREOF

CROSS-REFERENCE TO RELATED APPLICATIONS

This application is a continuation of International Application No. PCT/CN2020/109895, filed on Aug. 18, 2020, which claims priority to Chinese Patent Application No. 201910867477.2, filed on Sep. 12, 2019. The disclosures of the aforementioned applications are hereby incorporated by reference in their entireties.

TECHNICAL FIELD

The present disclosure relates to the field of electronic cigarettes, and in particular, to an electronic baking cigarette device and a heating apparatus thereof.

BACKGROUND

As a new type of electronic cigarette, a heat not burn (HNB) cigarette is a cigarette that uses a heat source to heat a tobacco material to obtain extracts from tobacco in a non-burning state, providing a consumer with a smoking experience similar to that of conventional tobacco-burning cigarettes. The pyrolysis reaction of the tobacco materials at a low temperature emits lower concentrations of harmful components such as tar. Currently, major cigarette manufacturers have launched different types of heating apparatuses for heating tobacco, such as sheet-like heating apparatuses, rod-shaped heating apparatuses, and tubular heating apparatuses.

Existing heating apparatuses on the market mainly include a substrate, a heating film having a certain resistance, a covering material, solder pads, and lead wires. For such heating apparatuses, special heating film patterns are prepared on the substrate, and the heating films having different patterns are electrified to generate a temperature field for baking tobacco to produce vapor. As is well known, vapor of the HNB cigarette mainly includes substances such as phenols, aldehydes, organic acids, and aromatic hydrocarbons, and the amounts of the substances generated vary greatly in different temperature ranges, leading to different vaping tastes.

Therefore, different temperature fields of the heating apparatuses have a direct impact on the vaping taste of low-temperature cigarettes. In existing products, an optimal temperature field is formed by optimizing only the heating film pattern, which has the following limitations: (1) The design of the heating film pattern needs to be optimized for different substrates, and the heating film pattern and the preparation process are complex, increasing the difficulty in product research, development, and manufacturing. (2) The size of the substrate of the heating apparatus is relatively small, making it difficult to design a heating film pattern on the substrate to cause the heating apparatus to form an optimal temperature field. (3) The entire surface of the heating apparatus including the positions of electrical conductors generate heat, but the positions of the electrical conductors of the heating apparatus do not participate in the process of heating and baking tobacco, leading to a low energy utilization rate of the heating apparatus.

Therefore, a new solution needs to be found to optimize the temperature field of the heating apparatus.

SUMMARY

To achieve the foregoing objectives, the present disclosure provides a heating apparatus, applicable to an electronic baking cigarette device, the heating apparatus including a substrate and a heating element combined on the substrate, the substrate including a root portion configured for fixing and an end portion for inserting a cigarette, where the substrate includes a first region close to the root portion and a second region close to the end portion, the first region has a first thermal conductivity, the second region has a second thermal conductivity, and the first thermal conductivity is less than the second thermal conductivity; and the heating element is combined in the first region.

In some embodiments, the second thermal conductivity is 10 W/(m·° C.) to 30 W/(m·° C.), and the first thermal conductivity is 1 W/(m·° C.) to 5 W/(m·° C.).

In some embodiments, the heating apparatus further includes two electrical conductors combined on the substrate; the two electrical conductors are combined in the first region, and the heating element is combined in the second region; and the two electrical conductors are electrically connected to two ends of the heating element respectively.

In some embodiments, the substrate further includes a third region located between the first region and the second region, the third region has a third thermal conductivity, and the third thermal conductivity is less than the second thermal conductivity and greater than the thermal conductivity of the first region.

In some embodiments, the second thermal conductivity is 15 W/(m·° C.) to 30 W/(m·° C.), the third thermal conductivity is 5 W/(m·° C.) to 15 W/(m·° C.), and the first thermal conductivity is 1 W/(m·° C.) to 5 W/(m·° C.).

In some embodiments, the substrate is elongated, and the first region, the third region, and the second region are sequentially distributed on a length direction of the substrate.

In some embodiments, the substrate is elongated, and the first region and the second region are distributed on a length direction of the substrate.

In some embodiments, the substrate is made of a non-metal material, a metal ceramic, or an alloy.

In some embodiments, a thickness of the substrate is 0.2 mm to 0.5 mm.

In some embodiments, the heating apparatus further includes an insulating layer, the insulating layer is located between the heating element and the substrate, and a thickness of the insulating layer is 0.2 μm to 0.5 μm.

In some embodiments, the heating element includes a first transition layer combined on the insulating layer, and a thickness of the first transition layer is 10 nm to 200 nm.

In some embodiments, a thickness of the heating element is 1 μm to 3.5 μm.

In some embodiments, the heating apparatus further includes two electrical conductors combined on the substrate, and a thickness of each of the two electrical conductors is 1 μm to 5 μm.

In some embodiments, the heating apparatus further includes a protective layer covered on the heating element, and a thickness of the protective layer is 100 nm to 1000 nm.

An electronic baking cigarette device is further provided, including the heating apparatus according to any one of the foregoing embodiments.

The present disclosure offers the following benefits: the substrate adopts a gradient thermal conductivity layout, so that the heating apparatus can have advantages such as a

DETAILED DESCRIPTION

The following further describes the present disclosure with reference to the accompanying drawings.

It should be understood that, the terms "front", "rear", "left", "right", "upper", "lower", "first", and "second" are merely used for ease of description of the technical solutions of the present disclosure rather than indicating that a mentioned apparatus or element needs to have a special difference. Therefore, such terms should not be construed as limiting of the present disclosure. It should be noted that, when an element is considered to be "connected to" another element, the element may be directly connected to the other element, or an intervening element may also be present. Unless otherwise defined, meanings of all technical and scientific terms used in this specification are the same as that usually understood by a person skilled in the technical field to which the present disclosure belongs. The benefits described in this specification are not intended to limit to the scope of the appended claims.

Figure 1:
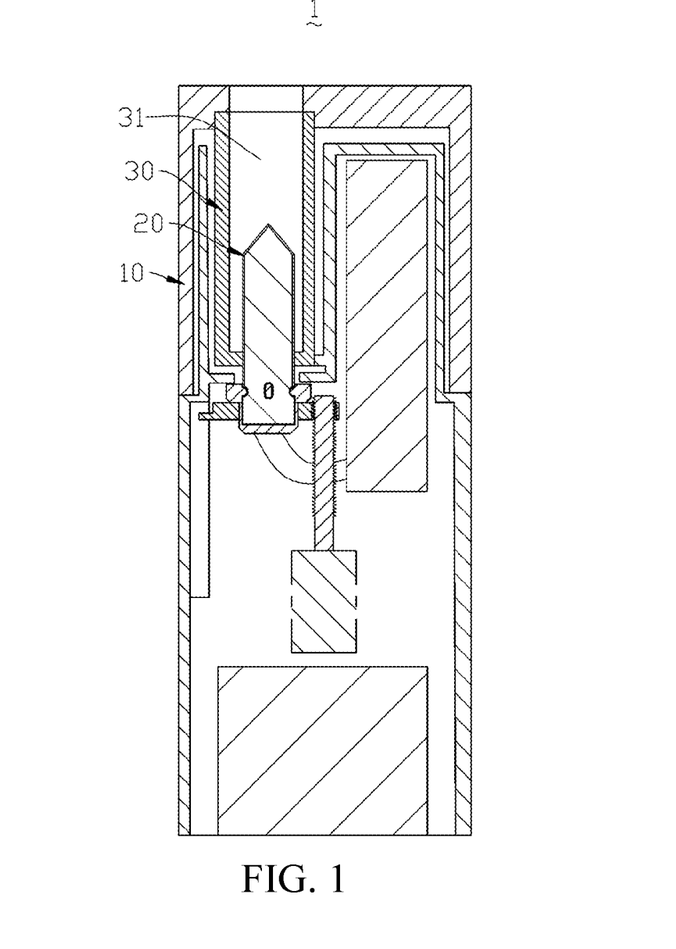
FIG. 1 is a schematic longitudinal cross-sectional structural view of an electronic baking cigarette device according to some embodiments of the present disclosure.
Figure 2:
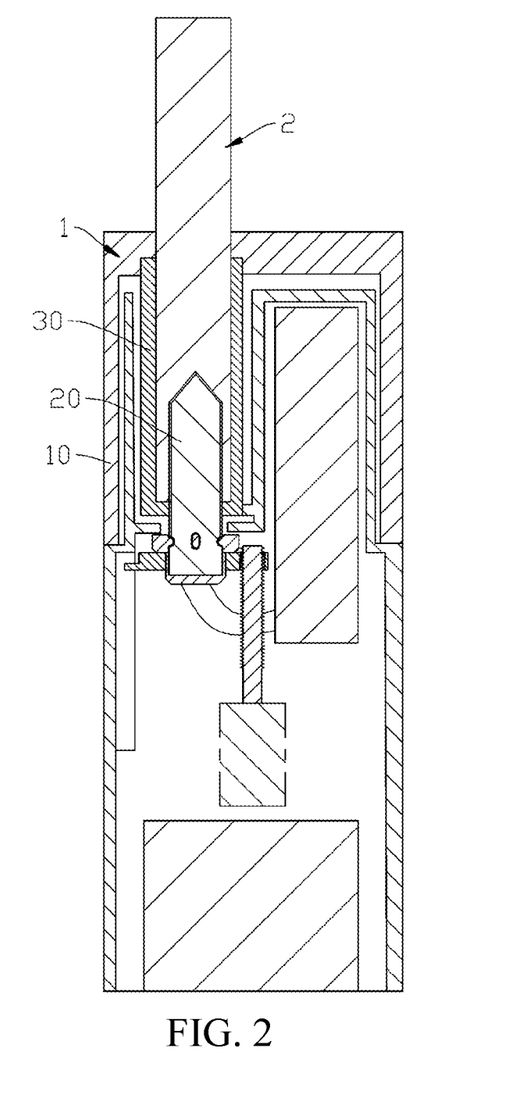
FIG. 2 is a schematic longitudinal cross-sectional structural view of the electronic baking cigarette device shown in FIG. 1 in a use state.

FIG. 1 shows an electronic baking cigarette device 1 according to some embodiments of the present disclosure. The electronic baking cigarette device 1 is configured to heat a solid cigarette 2 to obtain extracts from tobacco in a non-burning state. Referring to FIG. 2 together, in some embodiments, the electronic baking cigarette device 1 may include a housing 10 and a heating apparatus 20 and a cigarette container 30 that are disposed in the housing 10. The cigarette container 30 includes a chamber 31 matching the shape of the cigarette 2, so that the cigarette 2 can be inserted in the chamber. The heating apparatus 20 extends from a bottom of the cigarette container 30 into the chamber 31 of the cigarette container 30, so that when the cigarette 2 is inserted into the chamber 31 from outside to inside, the heating apparatus 20 can longitudinally penetrate the cigarette 2 from a bottom end of the cigarette 2 to enter close contact with tobacco in the cigarette 2. In this way, when the heating apparatus 20 is electrified to generate heat, the heat can be transferred to the tobacco, to heat the tobacco to generate vapor.

As shown in FIG. 1 again, in some embodiments, the heating apparatus 20 may be in the shape of an elongated sheet, and include a root portion A configured for fixing and an end portion B configured to extend into the chamber 31 of the cigarette container 30 in a suspended manner to get into the tobacco. In some embodiments, the end portion B is sharpened to facilitate the insertion into the tobacco. It may be understood that, the heating apparatus 20 is not limited to the shape of an elongated sheet, and may also be in other shapes such as a tube or a cylinder in some embodiments. In the heating apparatus 20, a substrate 21 having thermal conductivity gradients is disclosed by designing a pattern of the heating element 22 to optimize the temperature field. The substrate 21 has different thermal conductivities at different positions and the thermal conductivities exhibit a gradient change (that is, there are two or more thermal conductivity gradients from top (a position of a tip) to bottom (a position at which an electrical conductor is plated) in a length direction of the substrate 21), and values of the thermal conductivities are in ascending order. By plating the pattern of the heating element 22 on the substrate 21, this structure can optimize the thermal conductivity of the substrate and the pattern of the heating element 22, allowing the heating apparatus 20 to have advantages such as a higher energy utilization rate, a better temperature field, a large amount of vapor during vaping, and a better vaping taste.

Figure 3:
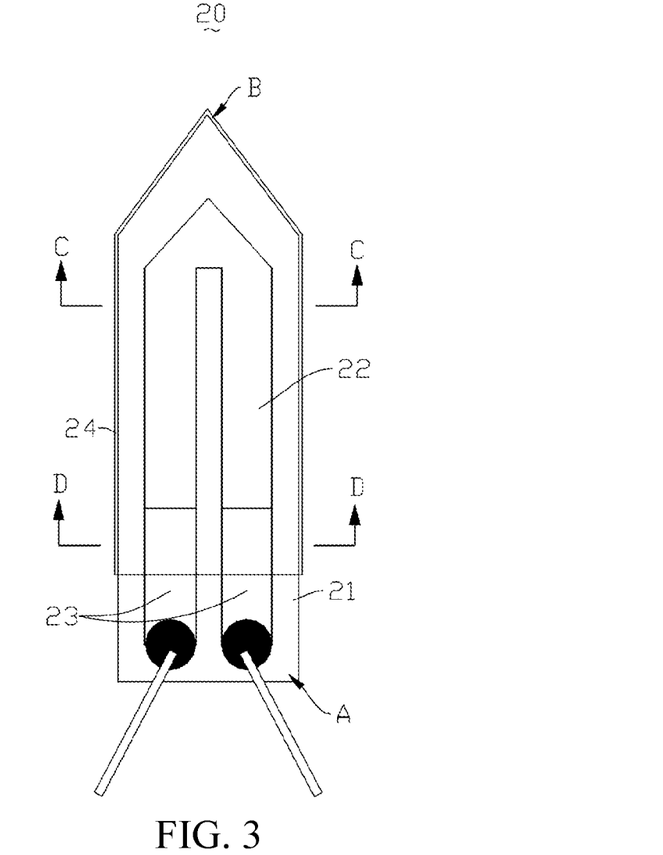
FIG. 3 is a schematic structural diagram of a heating apparatus of the electronic baking cigarette device shown in FIG. 1.
Figure 4:
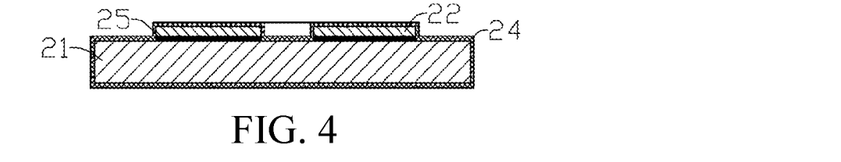
FIG. 4 is a schematic cross-sectional structural view taken in a C-C direction of the heating apparatus shown in FIG. 3.
Figure 5:
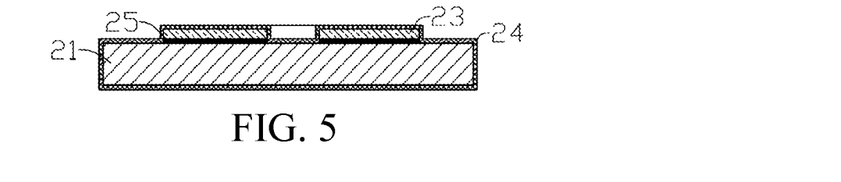
FIG. 5 is a schematic cross-sectional structural view taken in a D-D direction of the heating apparatus shown in FIG. 3.

As shown in FIG. 3 to FIG. 5, in some embodiments, the heating apparatus 20 may include a sheet-like substrate 21, a thin-film heating element 22 formed on a surface of the substrate 21, two thin-film electrical conductors 23 formed on the surface of the substrate 21, and a thin-film protective layer 24 covering surfaces of the substrate 21, the heating element 22, and the two electrical conductors 23. In some embodiments, the heating element 22, the electrical conductors 23, the protective layer 24, and an insulating layer 25 may all be of a thin-film structure, and formed by magnetron sputtering. In some embodiments, the substrate 21 is made of a non-metal material, a metal ceramic, or an alloy having a thermal conductivity gradient, and serves as a carrier for the sputtered heating element 22 and electrical conductors 23. The heating element 22 is configured to be electrified to stably generate heat to heat the tobacco. The two electrical conductors 23 are configured to electrically connect two ends of the heating element 22 to positive and negative electrodes of a power supply respectively. In some embodiments, the protective layer 24 is configured to reduce a corrosion effect of oxygen and impurities on the heating element 23, and reduce accumulation of soot to affect the vaping taste. Therefore, the protective layer 24 needs to meet the following conditions: having a thermal expansion coefficient matching that of the substrate, having good stability, being easy to clean, and being made of a ceramic material having good corrosion resistance such as $ZrO_2$, $Al_2O_3$, $SiO_2$, or $Si_3N_4$. In some embodiments, the protective layer 24 further covers part of surfaces of the two electrical conductors 23 close to the heating element 22.

In some embodiments, the heating apparatus 20 may further include an insulating layer 25, the insulating layer 25 is disposed between the heating element 22 and electrical conductors 23 and the substrate 21 and is configured to prevent the substrate 21 from forming a short circuit with the heating element 22 and the electrical conductors 23. Preferably, the insulating layer is an insulating material that can be stably bonded with the substrate 21, such as $SiO_2$, $ZrO_2$, or $Si_3N_4$. The protective layer 24 needs to cover at least the heating element 22, to isolate the heating element 22 from the tobacco, thereby preventing corrosion of the heating element 22 caused by the tobacco.

In some embodiments, the substrate 21 may have different thermal conductivities in different positions and the thermal conductivities exhibit a gradient change (that is, there are two or more thermal conductivity gradients from top (a position of the end portion) to bottom (a position of the root portion) in the length direction of the substrate), and values of the thermal conductivities are distributed in ascending order. By plating the pattern of the heating element 22 on the substrate 21, and the thermal conductivity of the substrate 21 and the pattern of the heating element 22 are optimized, allowing the heating apparatus 20 to have advantages such as a higher energy utilization rate, a better temperature field, a large amount of vapor during vaping, and a better vaping taste. In some embodiments, the substrate 21 may be made of a non-metal material, a metal ceramic, or an alloy having a thermal conductivity gradient.

Figure 6:
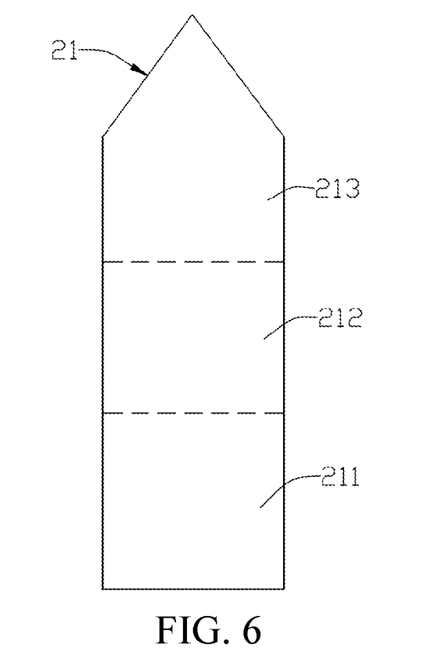
FIG. 6 is a schematic structural diagram of a substrate of the heating apparatus shown in FIG. 3.

As shown in FIG. 6, in some embodiments, the substrate 21 may include a root region 211 close to the root portion B, an end region 213 close to the end portion A, and a middle region 212 connecting the root region 211 and the end region 213. Thermal conductivities of the root region 21, the middle region 22, and the end region 23 are different, and are distributed in ascending order. In some embodiments, the thermal conductivity of the end region 23 may be 15 W/(m·° C.) to 30 W/(m·° C.), the thermal conductivity of the middle region 22 may be 5 W/(m·° C.) to 15 W/(m·° C.), and the thermal conductivity of the root region 21 may be 1 W/(m·° C.) to 5 W/(m·° C.).

Figure 7:
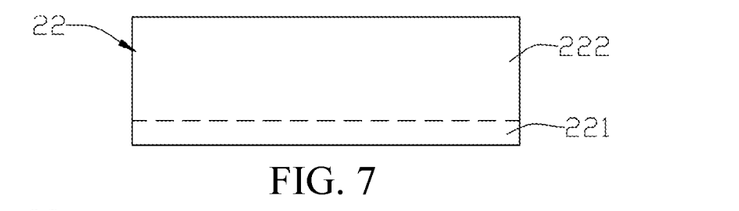
FIG. 7 is a schematic structural diagram of a heating element of the heating apparatus shown in FIG. 3.

As shown in FIG. 7, in some embodiments, the heating element 22 may include a first thin-film transition layer 221 located at a bottom layer and a thin-film heating layer 222 located on a surface of the first transition layer 221. The material of the heating layer 222 is preferably a material having a relatively small electrical resistivity, having a stable structural performance at a high temperature after generating heat, and having good oxidation resistance and corrosion resistance at a high temperature, for example, precious metals such as Au, Pt, or Ag, precious metal alloys such as AuAg, AuPd, PtRu, PtRh, or AgPd, or high-temperature alloy materials such as NiCr and NiCrAlY. The first transition layer 221 mainly functions to enhance a bonding force between the heating layer 222 and the substrate 21 and improve the stability of bonding between the heating layer 222 and the substrate after a large number of heat generation cycles, and may be made of an alloy such as ZrNi, Cr, or TiN that can form stable chemical bonding with the substrate 21 and the heating layer 222.

Figure 8:
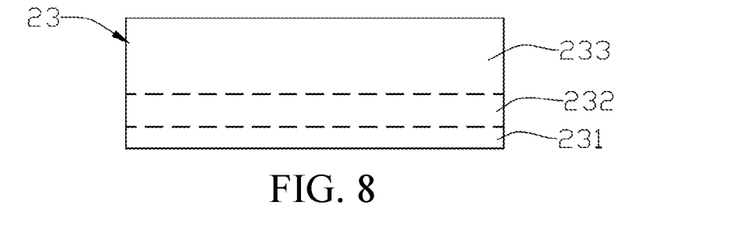
FIG. 8 is a schematic structural diagram of an electrical conductor of the heating apparatus shown in FIG. 3.

As shown in FIG. 8, in some embodiments, the electrical conductor 23 may include a pure titanium base layer 231, a pure nickel second transition layer 232, and a pure silver conductive layer 233.

Figure 9:
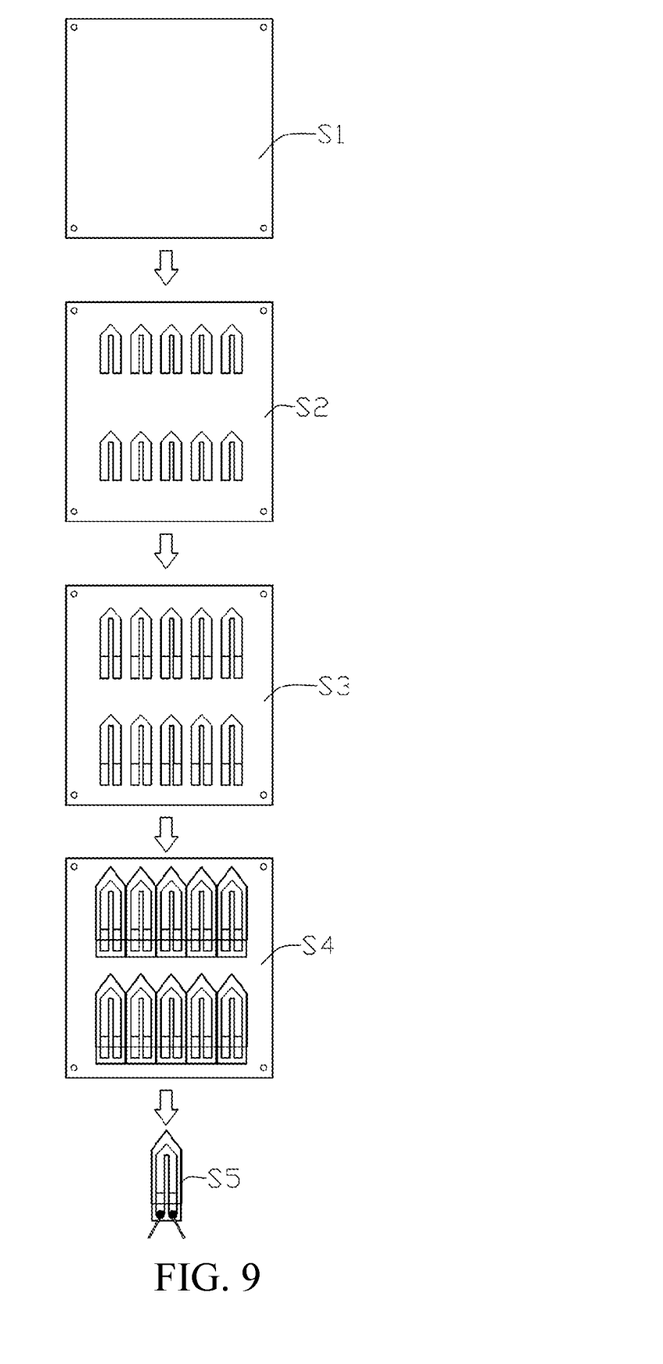
FIG. 9 is a schematic flowchart of a forming process of the heating apparatus shown in FIG. 3.

As shown in FIG. 9, in some embodiments, the heating apparatus 20 may be prepared by performing the following steps:

S1. Preparation of the Substrate 21:

(A) A substrate having a thermal conductivity gradient is prepared by using a powder metallurgy method.

(B) Treatment before coating:

The substrate is wiped and cleaned with ethanol and then placed in the chamber of a coating machine, followed by evacuation and preheating. The surface of the substrate is ion cleaned.

(C) Formation of the insulating layer:

Argon is introduced into the chamber to reach a working gas pressure of $2\times10^{-1}$ Pa. Coating is performed at a $ZrO_2$ target power density of 2 W/cm² to 6 W/cm² at room temperature for 60 min to 150 min. The $ZrO_2$ target power supply is then turned off.

S2. Formation of the Heating Element 22:

Argon is introduced into the chamber to reach a working gas pressure of $5\times10^{-1}$ Pa. Coating is performed at a ZrNi target power density of 6 W/cm² to 8 W/cm² at room temperature for 5 min to 15 min to form the first transition layer 221. The ZrNi target power supply is then turned off. A Pt target power supply is turned on. Coating is performed at a power density of 6 W/cm² to 8 W/cm² at room temperature for 60 min to 120 min, to form the heating layer 222 having a thickness of 1 μm to 3 μm.

S3. Formation of the Electrical Conductor 23:

Argon is introduced into the chamber to reach a working gas pressure of $5\times10^{-1}$ Pa. A titanium target power supply is turned on. Coating is performed at a power density of 6 W/cm² to 8 W/cm² at room temperature for 5 min to 10 min to form the base layer 231. A nickel target power supply is then turned on. Coating is performed at a power density of 6 W/cm² to 8 W/cm² at room temperature for 10 min to 30 min to form the second transition layer 232. A silver target power supply is turned on. Coating is performed at a power density of 4 W/cm² to 8 W/cm² at room temperature for 30 min to 120 min to form the conductive layer 233. Finally, lead wires are soldered on the conductive layer 233 to form conductive electrodes.

S4. Formation of the Protective Layer 24:

Argon and oxygen with a ratio of 1:1 are introduced to reach a working gas pressure of 0.2 Pa. Sputtering is performed at a sputtering power intensity of a $ZrO_2$ target direct current power supply at a temperature from normal temperature to 500° C., to form the protective layer 24 having a thickness of 100 nm to 1000 nm.

In addition, step S2 may further include a step of forming the pattern of the heating element 22.

To ensure the consistency of the temperature field of the heating region, the heating element 22 needs to be formed into a suitable pattern. The pattern of the heating element 22 may be prepared by using a masking method or an ion etching method. In the masking method, the non-pattern part is masked on the substrate 21, and the pattern of the heating element 22 is formed on the substrate 21 upon the sputtering of the heating element 22. In the ion etching method, first, the heating element 22 is coated on an entire surface, followed by photoresist application and exposure for curing. The exposed photoresist and the region of the heating element 22 are ion etched, and then the unexposed photoresist is removed, to form the required pattern of the heating element 22.

Compared with related technologies, the foregoing heating apparatus 20 has at least the following beneficial effects:

(1) Design and preparation processes of the pattern of the heating element 22 are simplified, and product research and development and manufacturing difficulties are reduced.

(2) The substrate 21 and the pattern of the heating element 22 are optimized together to form an optimal temperature field, to improve the vaping taste.

(3) The part of the substrate 21 on which the electrical conductor 23 is plated has a low thermal conductivity, and is low in temperature when the heating apparatus 20 generates heat, thereby achieving a higher energy utilization rate. Lead wires may be soldered to the electrical conductor 23, thereby improving the product preparation efficiency.

(4) By plating the thin-film heating element 22 on the substrate 21 having a thermal conductivity gradient by magnetron sputtering, the consistency of the resistance of the pattern of the heating element 22 can be improved and the variation range of the temperature coefficient of resistance (TCR) can be reduced, thereby achieving precise control of the heating field.

Figure 10:
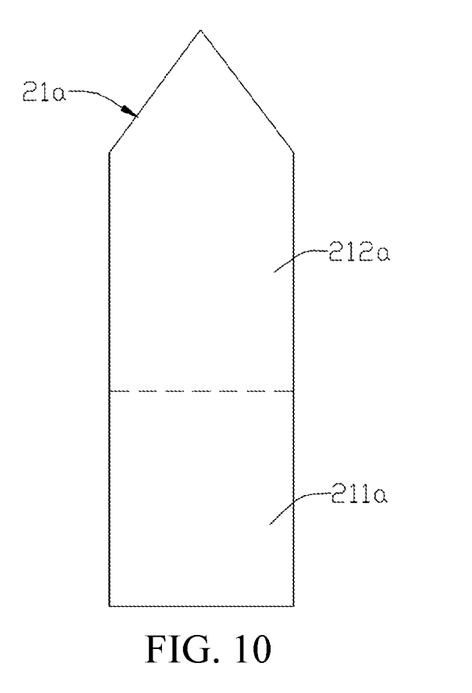
FIG. 10 is a schematic structural diagram of a substrate according to some other embodiments of the present disclosure.

FIG. 10 shows a substrate 21*a* in some other embodiments. The substrate 21*a* includes a root region 211*a* close to a root portion and an end region 212*a* close to an end portion, the end region 212*a* is adjacent to the root region 211*a*, and a thermal conductivity of the end region 212*a* is greater than a thermal conductivity of the root region 211*a*.

It may be understood that, the foregoing embodiments only describe exemplary implementations of the present disclosure specifically and in detail, but cannot be construed as a limitation to the patent scope of the present disclosure. It should be noted that a person of ordinary skill in the art may further freely combine the foregoing technical features or make several variations and improvements without departing from the concept of the present disclosure, and these variations and improvements all fall within the protection scope of the present disclosure. Therefore, any equivalent change or modification made within the scope of the claims of the present disclosure shall fall within the scope covered by the claims of the present disclosure.

What is claimed is:

1. A heating apparatus for an electronic baking cigarette device, the heating apparatus comprising:
    a substrate and a heating element on the substrate, the substrate comprising a root portion configured for fixing and an end portion for insertion into a cigarette, and
    wherein the root portion comprises a first region and the end portion comprises a second region,
    wherein the first region has a first thermal conductivity,
    wherein the second region has a second thermal conductivity,
    wherein the first thermal conductivity is less than the second thermal conductivity, and
    wherein the heating element is located in the first region.

2. The heating apparatus of claim 1, wherein the second thermal conductivity is 10 W/(m·° C.) to 30 W/(m·° C.), and
    wherein the first thermal conductivity is 1 W/(m·° C.) to 5 W/(m·° C.).

3. The heating apparatus of claim 2, wherein the heating apparatus comprises two electrical conductors on the substrate,
    wherein the two electrical conductors are located in the first region,
    wherein the heating element is located in the second region, and
    wherein the two electrical conductors are electrically connected to two ends of the heating element, respectively.

4. The heating apparatus of claim 1, wherein the substrate comprises a third region located between the first region and the second region,
    wherein the third region has a third thermal conductivity, and
    wherein the third thermal conductivity is less than the second thermal conductivity and greater than the thermal conductivity of the first region.

5. The heating apparatus according to of claim 4, wherein the second thermal conductivity is 15 W/(m·° C.) to 30 W/(m·° C.),
    wherein the third thermal conductivity is 5 W/(m·° C.) to 15 W/(m·° C.), and
    wherein the first thermal conductivity is 1 W/(m·° C.) to 5 W/(m·° C.).

6. The heating apparatus of claim 4, wherein the substrate is elongated, and
    wherein the first region, the third region, and the second region are sequentially distributed in a length direction of the substrate.

7. The heating apparatus of claim 1, wherein the substrate is elongated, and
    wherein the first region and the second region are distributed in a length direction of the substrate.

8. The heating apparatus of claim 1, wherein the substrate comprises a non-metal material, metal ceramic, or alloy.

9. The heating apparatus of claim 1, wherein a thickness of the substrate is 0.2 mm to 0.5 mm.

10. The heating apparatus of claim 9, further comprising:
    an insulating layer located between the heating element and the substrate,
    wherein a thickness of the insulating layer is 0.2 μm to 0.5 μm.

11. The heating apparatus of claim 10, wherein the heating element comprises a first transition layer on the insulating layer, and
    wherein a thickness of the first transition layer is 10 nm to 200 nm.

12. The heating apparatus of claim 11, wherein a thickness of the heating element is 1 μm to 3.5 μm.

13. The heating apparatus of claim 12, further comprising:
    two electrical conductors on the substrate,
    wherein a thickness of each electrical conductor of the two electrical conductors is 1 μm to 5 μm.

14. The heating apparatus of claim 13, further comprising:
    a protective layer on the heating element,
    wherein a thickness of the protective layer is 100 nm to 1000 nm.

15. An electronic baking cigarette device, comprising:
    the heating apparatus of claim 1.

16. The electronic baking cigarette device of claim 15, wherein the second thermal conductivity is 10 W/(m·° C.) to 30 W/(m·° C.), and
    wherein the first thermal conductivity is 1 W/(m·° C.) to 5 W/(m·° C.).

17. The electronic baking cigarette device of claim 16, wherein the heating apparatus further comprising:
    two electrical conductors on the substrate,
    wherein the two electrical conductors are located in the first region,
    wherein the heating element is located in the second region and
    wherein the two electrical conductors are electrically connected to two ends of the heating element, respectively.

18. The electronic baking cigarette device of claim 15, wherein the substrate comprises a third region located between the first region and the second region,
    wherein the third region has a third thermal conductivity, and
    wherein the third thermal conductivity is less than the second thermal conductivity and greater than the thermal conductivity of the first region.

19. The electronic baking cigarette device of claim 18, wherein the second thermal conductivity is 15 W/(m·° C.) to 30 W/(m·° C.),
    wherein the third thermal conductivity is 5 W/(m·° C.) to 15 W/(m·° C.), and wherein the first thermal conductivity is 1 W/(m·° C.) to 5 W/(m·° C.).

\* \* \* \* \*